United States Patent
Imai (10) Patent No.: US 8,081,543 B2
(45) Date of Patent: Dec. 20, 2011

(54) OPTICAL DISC APPARATUS AND FOCUS CONTROL METHOD

(75) Inventor: Takeshi Imai, Fujisawa (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 946 days.

(21) Appl. No.: 11/844,379

(22) Filed: Aug. 24, 2007

(65) Prior Publication Data

US 2008/0117783 A1 May 22, 2008

(30) Foreign Application Priority Data

Nov. 17, 2006 (JP) ................. 2006-311668

(51) Int. Cl.
*G11B 11/00* (2006.01)
(52) U.S. Cl. ............... 369/44.27; 369/53.28; 369/44.25; 369/44.26; 369/44.29; 369/44.34; 369/44.35; 369/53.23; 369/94
(58) Field of Classification Search .............. None
See application file for complete search history.

(56) References Cited

U.S. PATENT DOCUMENTS

| | | | | |
|---|---|---|---|---|
| 7,596,061 B2 * | 9/2009 | Kudo et al. | ................. | 369/44.23 |
| 7,606,122 B2 * | 10/2009 | Lee et al. | ................. | 369/44.29 |
| 2002/0159342 A1 * | 10/2002 | Ogasawara et al. | ........ | 369/44.23 |
| 2006/0153024 A1 * | 7/2006 | Lee et al. | ................. | 369/44.28 |
| 2007/0183274 A1 * | 8/2007 | Kudo et al. | ................. | 369/44.23 |
| 2008/0008057 A1 * | 1/2008 | Takeda et al. | .............. | 369/44.23 |

FOREIGN PATENT DOCUMENTS

| | | |
|---|---|---|
| JP | 2000-082226 | 3/2000 |
| JP | 2005-174421 | 6/2005 |
| JP | 2005-222572 | 8/2005 |
| JP | 2006-236572 | 9/2006 |

* cited by examiner

*Primary Examiner* — Joseph Haley
*Assistant Examiner* — Ifedayo Iluyomade
(74) *Attorney, Agent, or Firm* — Antonelli, Terry, Stout & Kraus, LLP.

(57) ABSTRACT

An optical disc apparatus according to the present invention steadily performs a focus jump operation and a track-crossing seek operation relative to an optical disc having a plurality of recording layers. A signal processing section generates a focus error signal based on a conventional astigmatism detection (CAD) system and a focus error signal based on a differential astigmatism detection (DAD) system from a detection signal generated by an optical detector. When a focus jump is to be performed from one recording layer of the optical disc to another recording layer, a focus drive signal that is generated from the focus error signal based on the CAD system is used. When a read/write operation is to be performed in relation to one recording layer, a focus drive signal that is generated from the focus error signal based on the DAD system is used.

5 Claims, 5 Drawing Sheets

FOCUS ERROR SIGNAL (CAD SYSTEM)

FIG.4

FOCUS ERROR SIGNAL (DAD SYSTEM)

FIG.5

FOCUS JUMP (CAD SYSTEM)

FIG.6

FOCUS JUMP (DAD SYSTEM)

(CAD SYSTEM + DAD SYSTEM)

FIG.7A
FOCUS ERROR SIGNAL
(DAD SYSTEM)
SIGNAL FOR SERVO
FUNCTION EXECUTION

FIG.7B
FOCUS ERROR SIGNAL
(CAD SYSTEM)
SIGNAL FOR TIMING
GENERATION

FIG.7C
FOCUS DRIVE SIGNAL

OPTICAL DISC APPARATUS AND FOCUS CONTROL METHOD

CLAIM OF PRIORITY

The present application claims priority from Japanese application serial No. JP 2006-311668, filed on Nov. 17, 2006, the content of which is hereby incorporated by reference into this application.

BACKGROUND OF THE INVENTION

1. Field of the Invention

The present invention relates to an optical disc apparatus that writes information onto or reads information from an optical disc, and more particularly to a technology for exercising ideal focus control over an optical disc having a plurality of recording layers.

2. Description of the Related Art

For example, a focus error signal derived from the use of a conventional astigmatism detection (CAD) system or a differential astigmatism detection (DAD) system is conventionally used for focus control over an optical pickup objective lens of an optical disc apparatus. The CAD system is used to detect zero-order light, which is included in reflected laser light that has passed through the objective lens, perform an addition/subtraction process on the zero-order light, and form the focus error signal. The DAD system is used to detect zero-order light and ±first-order light, which are included in the reflected laser light that has passed through the objective lens, perform an addition/subtraction process on the zero-order light and ±first-order light, and form the focus error signal.

The CAD system has a simple configuration, but is susceptible to disturbance. On the other hand, the DAD system can provide accurate focus control because it can suppress the leakage of reflected laser light from an adjacent track when a laser beam spot, which is formed on an optical disc surface due to light condensation by the objective lens, crosses a recording track while a tracking servo is OFF. The DAD system is often used because it, for instance, assures stability during a seek operation and reduces the power consumption.

A technology for providing improved focus control is disclosed, for instance, by JP-A-2000-82226. For a DVD-RAM disc, this technology uses the focus error signal derived from the DAD system to exercise focus control over the objective lens. For a DVD-ROM disc, however, this technology uses the focus error signal derived from the CAD system to exercise focus control over the objective lens. Another technology for providing improved focus control is disclosed, for instance, by JP-A-2005-174421. This technology obtains the focus error signal through the so-called DAD system and a tracking error signal through the use of a differential push-pull method. More specifically, to considerably reduce the influence of disturbance that affects the focus error signal and an offset that affects the tracking error signal, this technology provides a selector switch for a circuit that performs an addition/subtraction process on signals fed from optical detectors, and operates the selector switch so that the divided regions of an output source for signals of two optical detectors, which are to be added, belong to the same optical detector or belong to the regions of the two optical detectors.

SUMMARY OF THE INVENTION

The CAD system is at a disadvantage in that the reflected laser light leaking out of an adjacent track appears as a pulsed waveform over the focus error signal when the laser beam spot, which is formed on the optical disc surface due to light condensation by the objective lens, crosses a recording track while the tracking servo is OFF. Therefore, the above-mentioned laser light leakage degrades focus control stability while the tracking servo is OFF, for instance, for a seek operation.

On the other hand, the DAD system is at a disadvantage in that a sub-beam generates unwanted light between recording layers when the objective lens is swept upward or downward over an optical disc having a plurality of recording layers. Therefore, the focus error signal becomes a waveform that contains a waveform formed by the unwanted light. When a focus jump process is performed for inter-layer movement, the control timing, for instance, for switching of a lens focusing direction drive voltage is based on the focus error signal. Therefore, if an unwanted waveform is input due to the use of the DAD system, the control timing is disordered so that a focus jump fails.

As described above, the focus error signals derived from the CAD system and DAD system both have advantages and disadvantages when they are used for focus control purposes. For best results, it is necessary that these focus error signals be selectively used depending on the employed operation mode.

The technology disclosed by JP-A-2000-82226 changes the focus error signal system in accordance with the employed optical disc (DVD-RAM or DVD-ROM), whereas the technology disclosed by JP-A-2005-174421 reduces the influence of disturbance that affects the focus error signal particularly at the time of track crossing. Neither of these patents pays special attention to a focus jump in relation to an optical disc having a plurality of recording layers.

Further, after the focus error signal is switched between the CAD system and DAD system, the servo status may become unstable to cause a servo pull-in failure due, for instance, to inaccurate switching timing or DC offset discrepancy between the two systems.

An object of the present invention is to ensure that a focus jump operation and a track-crossing seek operation are steadily performed relative to an optical disc having a plurality of recording layers without changing a focus error signal system.

According to one aspect of the present invention, there is provided an optical disc apparatus that reads or writes an information signal by irradiating an optical disc having a plurality of recording layers with laser light, the optical disc apparatus comprising: a disc motor that rotates the optical disc; an optical pickup that includes a laser light source which generates laser light, an objective lens which irradiates the optical disc with laser light, an optical detector which detects light reflected from the optical disc, and a focus actuator which moves the objective lens vertically in relation to a surface of the optical disc; a signal processing section that generates a focus error signal based on a conventional astigmatism detection (CAD) system and a focus error signal based on a differential astigmatism detection (DAD) system from a detection signal generated by the optical detector; and a servo section that provides focus control by giving a focus drive signal to the focus actuator. The servo section concurrently inputs the focus error signal based on the CAD system and the focus error signal based on the DAD system from the signal processing section. When a focus jump is to be performed from one recording layer of the optical disc to another recording layer, the servo section uses a focus drive signal that is generated from the focus error signal based on the CAD system. When information is to be written into or read from one recording layer, the servo section uses a focus drive signal that is generated from the focus error signal based on the DAD system.

The signal processing section generates the focus error signal based on the CAD system from zero-order light that is included in the light reflected from the optical disc when the optical disc is irradiated with laser light, and generates the focus error signal based on the DAD system from zero-order light and ±first-order light that are emitted from the optical disc when the optical disc is irradiated with laser light.

The servo section includes a focus jump control section, that inputs the focus error signal based on the CAD system, and generates and outputs a focus drive signal; a focus servo control section, that inputs the focus error signal based on the DAD system, and generates and outputs a focus drive signal; and a selector switch, that selects either an output from the focus jump control section or an output from the focus servo control section in accordance with an operation mode.

According to another aspect of the present invention, there is provided a focus control method for exercising focus position control by irradiating an optical disc having a plurality of recording layers with laser light, the method comprising the steps of: detecting light reflected from the optical disc; and generating a focus error signal based on a conventional astigmatism detection (CAD) system and a focus error signal based on a differential astigmatism detection (DAD) system, wherein, when a focus jump is to be performed from one recording layer of the optical disc to another recording layer, a focus drive signal that is generated from the focus error signal based on the CAD system is selected to exercise focus control; and wherein, when information is to be written into or read from one recording layer, a focus drive signal that is generated from the focus error signal based on the DAD system is selected to exercise focus control.

The present invention assures the stability of a focus control operation that is performed for an optical disc having a plurality of recording layers, and contributes to the improvement of read/write quality.

BRIEF DESCRIPTION OF THE DRAWINGS

These and other features, objects, and advantages of the present invention will become more apparent from the following description when taken in conjunction with the accompanying drawings wherein.

DETAILED DESCRIPTION OF THE EMBODIMENTS

An embodiment of the present invention will now be described with reference to the accompanying drawings.

Figure 1:
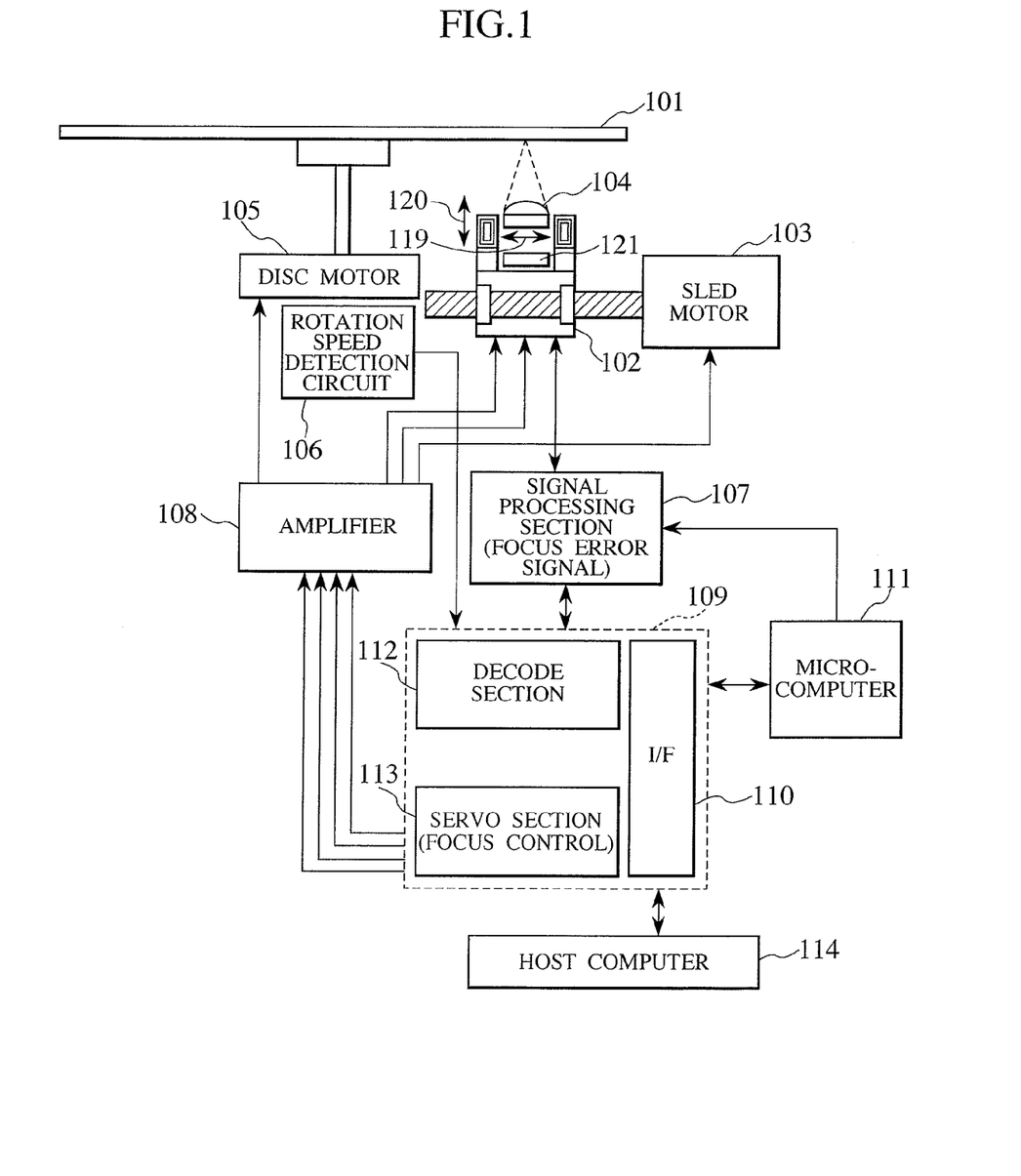
FIG. 1 is a block diagram illustrating an optical disc apparatus according to an embodiment of the present invention.

FIG. 1 is a block diagram illustrating an optical disc apparatus according to an embodiment of the present invention. An optical disc 101 is a DVD+R disc, DVD-R disc, or other medium having a plurality of recording layers. It is rotated by a disc motor 105. Its rotation speed is detected by a rotation speed detection circuit 106. An optical pickup 102 includes a laser light source (not shown) that generates laser light having a predetermined intensity for read and write purposes. It irradiates the recording surface of a recording layer of the optical disc 101 via an objective lens 104. Light reflected from the recording surface of the optical disc 101 is received by an optical detector 121 via the objective lens 104 and converted to an electrical signal. A tracking actuator 119 and a focus actuator 120 in the optical pickup 102 move the objective lens 104 in horizontal or vertical direction relative to an optical disc surface. A sled motor 103 rotates a lead screw member to move the optical pickup 102 in the radial direction of the optical disc.

A signal processing section 107 generates a write signal for writing information onto the optical disc 101, and supplies the generated write signal to the optical pickup 102. The signal processing section 107 also generates a tracking error signal, a focus error signal, and an RF signal from a read signal of the optical detector 121. A digital signal processor (DSP) 109 includes an interface (I/F) 110, a decoder section 112, and a servo section 113. The interface (I/F) 110 exchanges commands and read/write data with a host computer 114. The decoder section 112 decodes a read RF signal into data. The servo section 113 generates a tracking control signal and a focus control signal from the tracking error signal and focus error signal, which are generated by the signal processing section 107, and controls the tracking actuator 119 and focus actuator 120 via an amplifier 108. The servo section 113 also drives the disc motor 105 and sled motor 103 via the amplifier 108. A microcomputer 111 provides overall control over the optical disc apparatus.

In the present embodiment, particularly, the signal processing section 107 outputs concurrently to the servo section the focus error signal based on the conventional astigmatism detection (CAD) system and the focus error signal based on the differential astigmatism detection (DAD) system. The present embodiment is also configured so that the servo section 113 uses an input focus error signal based on the DAD system to perform a focus servo function, and determines the focus jump control timing in a focus jump process by using the input focus error signal based on the CAD system. More specifically, when a read or write operation is to be performed in relation to a recording layer of the optical disc 101, the focus error signal based on the DAD system is used to output a focus servo control signal, and when a focus jump is to be performed to switch from one recording layer to another, the focus error signal based on the CAD system is used to output a focus jump drive signal.

Figure 2:
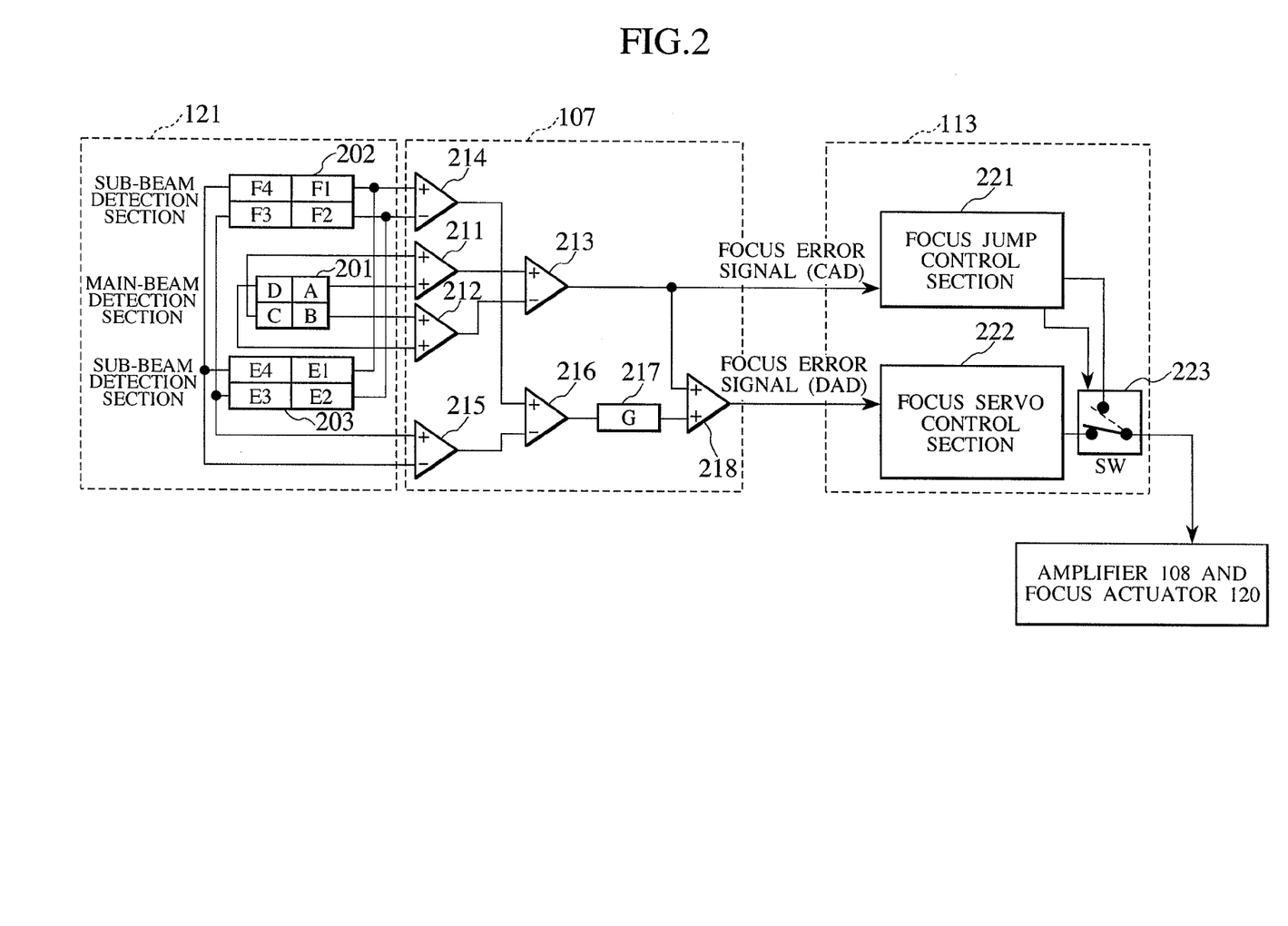
FIG. 2 illustrates the configuration of a focus control system in the optical disc apparatus shown in FIG. 1.

FIG. 2 illustrates the configuration of a focus control system in the optical disc apparatus shown in FIG. 1. This figure shows the internal configurations of the optical detector 121, which detects reflected laser light, the signal processing section 107, which performs an addition/subtraction process on the signal from the optical detector 121, and the servo section 113, which performs a focus jump process by exercising the focus servo function in relation to the focus error signal generated by the signal processing section 107.

A main beam detection section 201 in the optical detector 121 has a plurality of light reception regions (A, B, C, and D) and receives zero-order diffracted light of reflected light. Sub-beam detection sections 202, 203 have a plurality of light reception regions (F1, F2, F3, and F4) and a plurality of light reception regions (E1, E2, E3, and E4), respectively, and receive i first-order diffracted light of reflected light.

In the signal processing section 107, addition circuits 211, 212, 218 and subtraction circuits 213, 214, 215, 216 are combined to perform an addition/subtraction process on detection signals from the light reception regions. A gain regulator 217 adjusts the addition ratio of signals fed from the sub-beam detection sections 202, 203, which are to be added to a signal fed from the main beam detection section 201. As a result, the addition circuit 213 obtains the focus error signal based on the conventional astigmatism detection (CAD) system from the signal detected by the main beam detection section 201. Further, the addition circuit 218 obtains the focus error signal based on the differential astigmatism detection (DAD) system by synthesizing the signals detected by the main beam detection section 201 and sub-beam detection sections 202, 203. These two different focus error signals are concurrently output to the servo section 113.

The servo section 113 includes a focus jump control section 221, a focus servo control section 222, and a selector switch 223. The focus jump control section 221 inputs the focus error signal based on the CAD system at all times, generates the focus jump drive signal for performing a focus jump to change the recording layer, and determines its control timing. On the other hand, the focus servo control section 222 inputs the focus error signal based on the DAD system at all times, and generates the focus servo control signal for performing a read or write operation in relation to a recording layer. The selector switch 223 selects either a focus jump mode or a focus servo mode in accordance with an instruction from the focus jump control section 221, and properly changes a focus drive control signal that is to be supplied to the amplifier 108 and focus actuator 120. In the configuration described above, the focus jump control section 221 inputs the focus error signal based on the CAD system at all times and cannot input the focus error signal based on the DAD system. On the other hand, the focus servo control section 222 inputs the focus error signal based on the DAD system at all times and cannot input the focus error signal based on the CAD system. Therefore, the operations of these sections are subjected to drive control based on the optimum focus error signal and cannot be performed erroneously.

The focus error signals based on the CAD and DAD systems will now be compared to describe the stability of focus jump operation and focus servo control.

Figure 3:
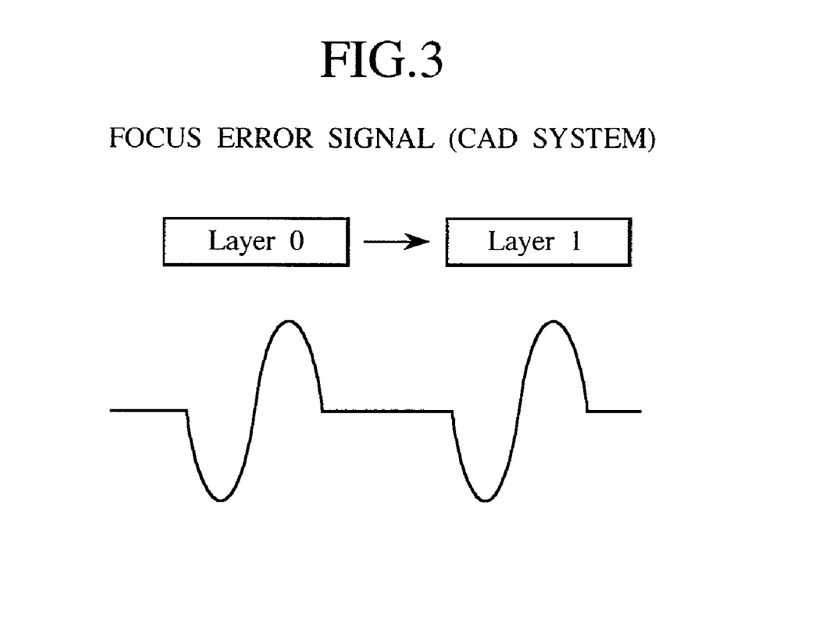
FIG. 3 shows a typical focus error signal waveform based on a CAD system that is obtained when a focus sweep is performed.

FIG. 3 shows a typical focus error signal waveform based on the CAD system that is obtained when a focus sweep is performed. The focus error signal has an S-shaped curved waveform. When the objective lens is swept upward or downward over the optical disc having a plurality of recording layers (the figure indicates that the objective lens is swept from Layer 0 to Layer 1), two S-shaped curves are obtained. When the CAD system is employed, no unwanted laser light is detected between the recording layers. Thus, the obtained focus error signal is satisfactory.

Figure 4:
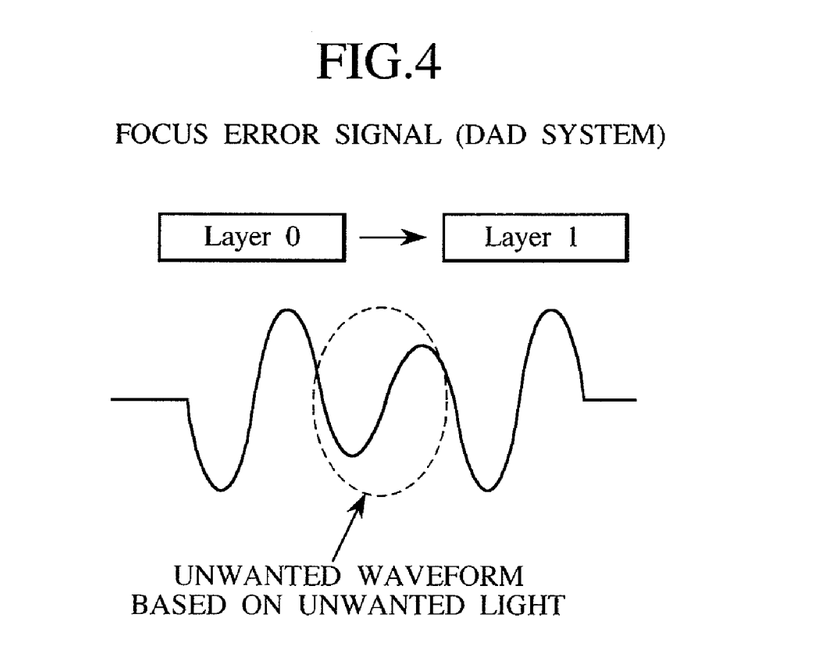
FIG. 4 shows a typical focus error signal waveform based on a DAD system that is obtained when a focus sweep is performed.

FIG. 4 shows a typical focus error signal waveform based on the DAD system that is obtained when a focus sweep is performed. When the objective lens is swept upward or downward over the optical disc having a plurality of recording layers (the figure indicates that the objective lens is swept from Layer 0 to Layer 1), the use of the DAD system invokes unwanted light between the recording layers due to a sub-beam. Thus, the obtained focus error signal turns out to be a waveform that contains an unwanted waveform due to the unwanted light.

Figure 5:
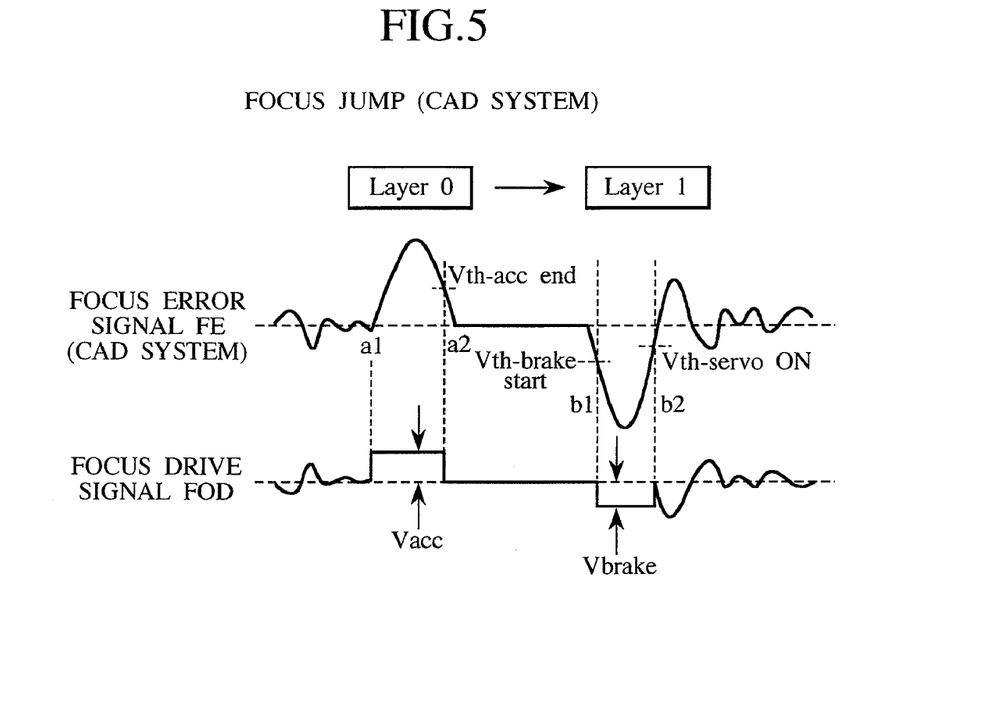
FIG. 5 shows typical focus jump waveforms that are derived from the focus error signal based on the CAD system, which is shown in FIG. 3.

FIG. 5 shows typical focus jump waveforms that are derived from the focus error signal FE based on the CAD system, which is shown in FIG. 3. As a focus drive signal FOD, an acceleration voltage Vacc for accelerating the objective lens during its movement from Layer 0 to Layer 1 and a deceleration voltage Vbrake for decelerating a moving objective lens and stopping it at Layer 1 are applied.

When an instruction for starting a focus jump is received (a1), the application of the acceleration voltage Vacc begins. When the objective lens moves away from the neighborhood of Layer 0, that is, when the focus error signal FE passes a threshold value Vth (acc end) (a2), the application of the acceleration voltage Vacc stops. Subsequently, the objective lens continues to move. When the objective lens reaches the neighborhood of Layer 1, that is, when the focus error signal FE passes a threshold value Vth (brake start) (b1), the application of the deceleration voltage Vbrake begins. Further, when the objective lens reaches Layer 1 to let the focus error signal FE pass a threshold value Vth (servo ON) (b2), the application of the deceleration voltage Vbrake stops. At the same time, a focus servo is turned ON to start a read or write operation in relation to Layer 1.

As described above, the use of the CAD system ensures that the focus error signal FE contains no unwanted waveform. It is therefore possible to ideally perform a focus jump (acceleration and deceleration) to Layer 1 and effect a shift to the focus servo.

However, when the CAD system is employed, reflected laser light leaking out of an adjacent track appears as a pulsed waveform over the focus error signal when a laser beam spot, which is formed on an optical disc surface due to light condensation by the objective lens, crosses a recording track while the tracking servo is OFF. The laser light leakage degrades focus control stability while the tracking servo is OFF, for instance, for a seek operation.

Figure 6:
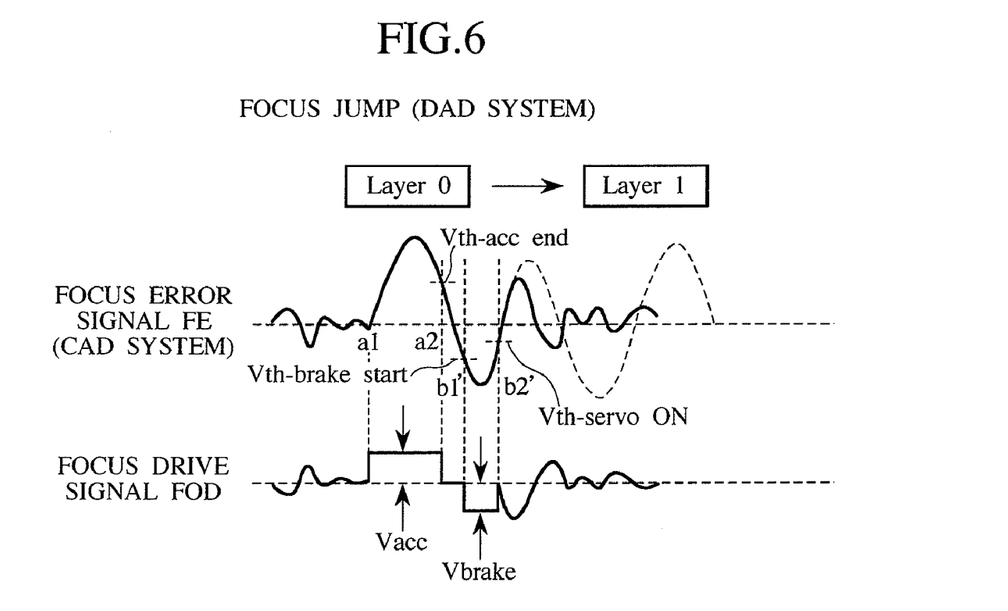
FIG. 6 shows typical focus jump waveforms that are derived from the focus error signal based on the DAD system, which is shown in FIG. 4.

FIG. 6 shows typical focus jump waveforms that are derived from the focus error signal FE based on the DAD system, which is shown in FIG. 4. In the focus jump process, the level of the focus error signal FE is compared against a threshold value to generate the focus drive signal FOD. If the focus error signal FE contains an unwanted waveform as shown in FIG. 4, the focus drive signal FOD is improperly timed. For example, the unwanted waveform of the focus error signal FE reaches the threshold value Vth (brake start) at a position (b1') intermediate between Layer 0 and Layer 1, thereby starting the application of the deceleration voltage Vbrake. Similarly, the unwanted waveform reaches the threshold value Vth (servo ON) at an intermediate position (b2'), thereby stopping the application of the deceleration voltage Vbrake and turning ON the focus servo. As a result, a focus pull-in failure occurs at Layer 1, which is a target layer.

Figures 7A, 7B:
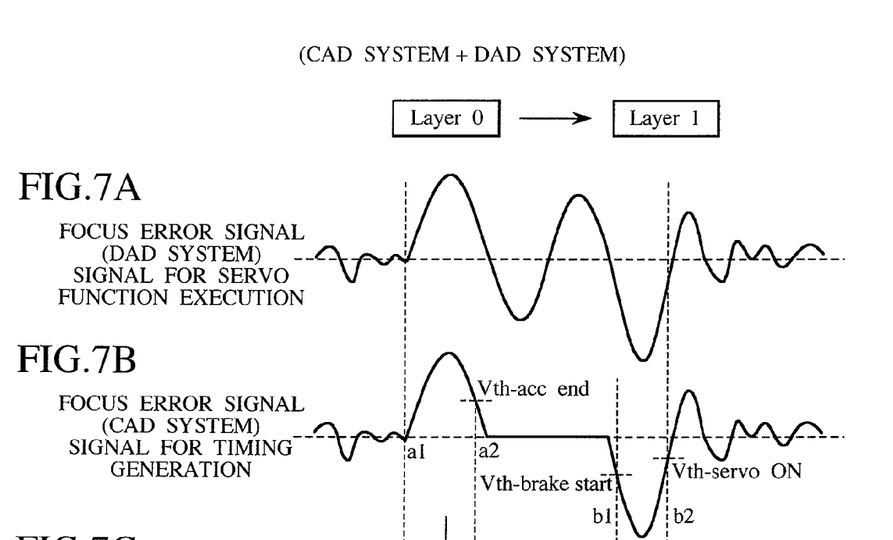
FIG. 7 illustrates a focus control operation that is performed in the optical disc apparatus according to an embodiment of the present invention.
Figure 7C:
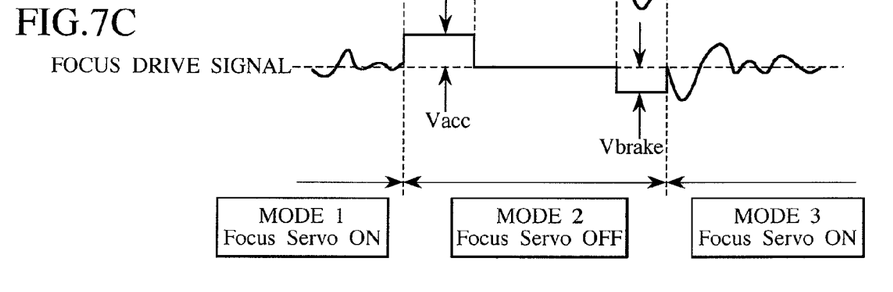

FIG. 7 illustrates a focus control operation that is performed in the optical disc apparatus according to the present embodiment. Waveform (a) is a focus error signal waveform based on the DAD system. Waveform (b) is a focus error signal waveform based on the CAD system. Waveform (c) is a focus drive signal waveform.

As described with reference to FIG. 2, the focus error signal based on the DAD system enters the focus servo control section 222 and is used to generate a drive signal for focus servo control. On the other hand, the focus error signal based on the CAD system enters the focus jump control section 221 and is used to generate a drive signal for a focus jump. The selector switch 223 selects either of these two drive signals as a focus drive signal.

The focus control operation will now be described with reference to three different modes.

In Mode 1, a read or write operation is performed at Layer 0 (recording layer 0). In this mode, the selector switch 223 selects the drive signal from the focus servo control section 222 and exercises control with the servo turned ON.

In Mode 2, a focus jump is performed from Layer 0 to Layer 1 (recording layer 1). In this mode, the selector switch 223 selects the drive signal from the focus jump control section 221 and exercises focus jump control. The servo is OFF in this mode. In a focus jump operation, the focus error signal based on the CAD system is compared against various threshold values to control the application periods of the acceleration voltage Vacc and deceleration voltage Vbrake, as described in detail with reference to FIG. 5.

In Mode 3, a read or write operation is performed at Layer 1. In this mode, the selector switch 223 selects again the drive signal from the focus servo control section 222 and exercises control with the servo turned ON.

As regards the switching timing of the selector switch 223, a shift from Mode 1 to Mode 2 is effected when a jump instruction is issued. A shift from Mode 2 to Mode 3 is effected when the level of the focus error signal reaches the threshold value Vth (servo ON) (b2). In this instance, the focus error signal based on the CAD system is used. Therefore, there is no unwanted waveform or other disturbance. Consequently, a servo pull-in operation is properly performed.

As described above, the focus control section according to the present embodiment generates a drive signal for focus servo control from the focus error signal based on the DAD system and generates a drive signal for a focus jump from the focus error signal based on the CAD system. In such an instance, the focus control section does not change the focus error signal system for input purposes. Therefore, the focus control section does not suffer a servo pull-in failure or incur servo instability, which may arise after a focus error signal system changeover, due, for instance, to an improperly timed changeover or DC offset discrepancy between the two systems. As a result, the focus control section can steadily perform a focus jump operation and a track-crossing seek operation relative to an optical disc having a plurality of recording layers.

The present embodiment has been described on the assumption that a focus jump is performed from Layer 0 to Layer 1 of an optical disc having a plurality of recording layers. However, the present invention is not limited to such a focus jump and can be applied to a situation where the objective lens moves from an initial position (standby position) to a desired recording layer (e.g., Layer 1) for a focus search.

While we have shown and described an embodiment in accordance with our invention, it should be understood that a disclosed embodiment is susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc apparatus that reads or writes an information signal by irradiating an optical disc having a plurality of recording layers with laser light, the optical disc apparatus comprising:

a disc motor that rotates the optical disc;

an optical pickup that includes a laser light source which generates laser light, an objective lens which irradiates the optical disc with laser light, an optical detector which detects light reflected from the optical disc, and a focus actuator which moves the objective lens vertically in relation to a surface of the optical disc;

a signal processing section that generates a focus error signal based on a conventional astigmatism detection (CAD) system and a focus error signal based on a differential astigmatism detection (DAD) system from a detection signal generated by the optical detector;

a servo section that provides focus control by giving a focus drive signal to the focus actuator, the servo section including:

a focus lump control section, that inputs the focus error signal based on the CAD system, and generates and outputs a focus drive signal, a focus servo control section, that inputs the focus error signal based on the DAD system, and generates and outputs a focus drive signal, and a selector switch, that selects either an output from the focus jump control section or an output from the focus servo control section in accordance with an operation mode;

wherein the servo section concurrently inputs the focus error signal based on the CAD system and the focus error signal based on the DAD system from the signal processing section;

wherein, when a focus jump is to be performed from one recording layer of the optical disc to another recording layer, the servo section uses a focus drive signal that is generated from the focus error signal based on the CAD system; and wherein, when information is to be written into or read from one recording layer, the servo section uses a focus drive signal that is generated from the focus error signal based on the DAD system.

2. The optical disc apparatus according to claim 1, wherein the signal processing section generates the focus error signal based on the CAD system from zero-order light that is included in the light reflected from the optical disc when the optical disc is irradiated with the laser light, and wherein the signal processing section generates the focus error signal based on the DAD system from zero-order light and ±first-order light that are emitted from the optical disc when the optical disc is irradiated with the laser light.

3. An optical disc apparatus that reads or writes an information signal by irradiating an optical disc having a plurality of recording layers with laser light, the optical disc apparatus comprising:

a disc motor that rotates the optical disc;

an optical pickup that includes a laser light source which generates laser light, an objective lens which irradiates the optical disc with laser light, an optical detector which detects light reflected from the optical disc, and a focus actuator which moves the objective lens vertically in relation to a surface of the optical disc;

a signal processing section that generates (1) a focus error signal based on a conventional astigmatism detection (CAD) system, and (2) a focus error signal based on a differential astigmatism detection (DAD) system from a detection signal generated by the optical detector;

a servo section that provides focus control by outputting a focus drive signal to the focus actuator, the servo section including:

a focus jump control section, that inputs the focus error signal based on the CAD system, and generates and outputs a focus drive signal, a focus servo control section, that inputs the focus error signal based on the DAD system, and generates and outputs a focus drive signal, and a selector switch, that selects either an output from the focus jump control section or an output from the focus servo control section, the output from the focus jump control section being selected when a focus jump is to be performed from one recording layer of the optical disc to another recording layer, and the output from the focus servo control section being selected when information is to be written into or read from one recording layer.

4. The optical disc apparatus according to claim 3, wherein the signal processing section generates the focus error signal based on the CAD system from zero-order light that is included in the light reflected from the optical disc when the optical disc is irradiated with the laser light, and wherein the signal processing section generates the focus error signal based on the DAD system from zero-order light and ±first-order light that are emitted from the optical disc when the optical disc is irradiated with the laser light.

5. An optical disc apparatus that reads or writes an information signal by irradiating an optical disc having a plurality of recording layers with laser light, the optical disc apparatus comprising:

a disc motor that rotates the optical disc;

an optical pickup that includes a laser light source which generates laser light, an objective lens which irradiates the optical disc with laser light, an optical detector which detects light reflected from the optical disc, and a focus actuator which moves the objective lens vertically in relation to a surface of the optical disc;

a signal processing section that generates (1) a focus error signal based on a conventional astigmatism detection (CAD) system from zero-order light that is included in the light reflected from the optical disc when the optical disc is irradiated with the laser light, and (2) a focus error signal based on a differential astigmatism detection (DAD) system from zero-order light and ±first-order light that are emitted from the optical disc when the optical disc is irradiated with the laser light;

a servo section that provides focus control by outputting a focus drive signal to the focus actuator, the servo section including:

a focus jump control section, that inputs the focus error signal based on the CAD system, and generates and outputs a focus drive signal, a focus servo control section, that inputs the focus error signal based on the DAD system, and generates and outputs a focus drive signal, and a selector switch, that selects either an output from the focus jump control section or an output from the focus servo control section, the output from the focus jump control section being selected when a focus jump is to be performed from one recording layer of the optical disc to another recording layer, and the output from the focus servo control section being selected when information is to be written into or read from one recording layer.

\* \* \* \* \*